J. L. STACKPOLE.
EMULSIFIER.
APPLICATION FILED MAY 8, 1911.
1,152,127.
Patented Aug. 31, 1915.
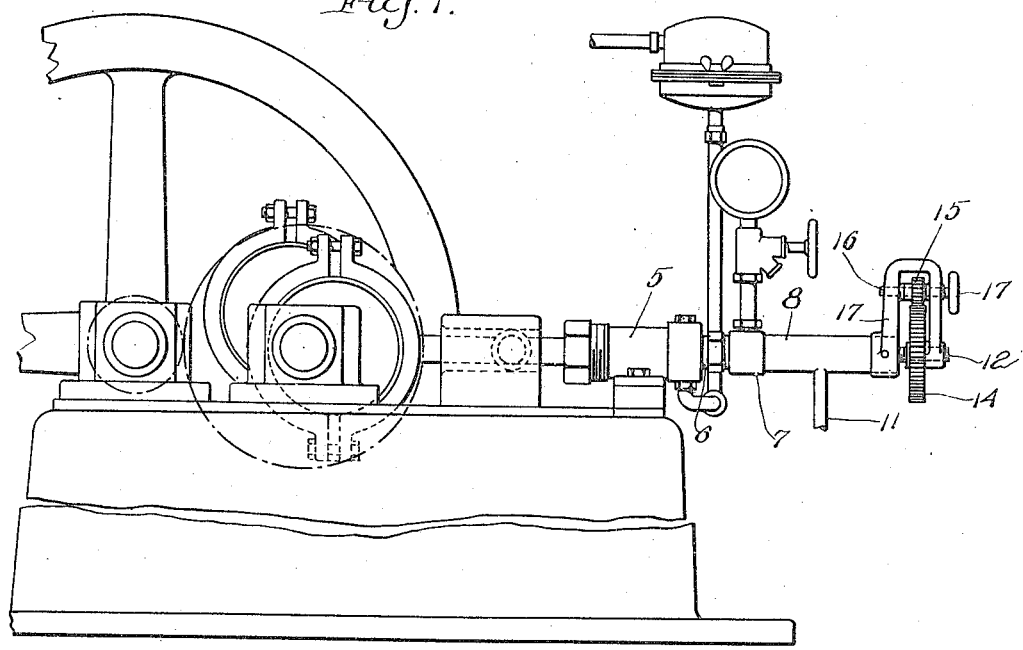
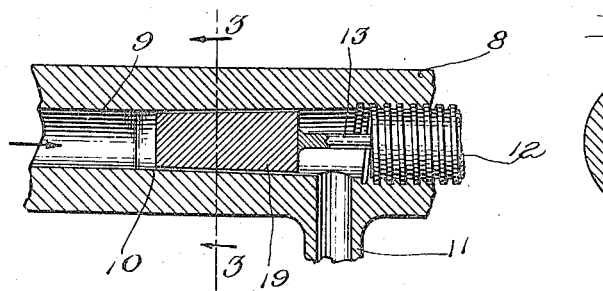
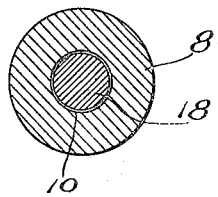
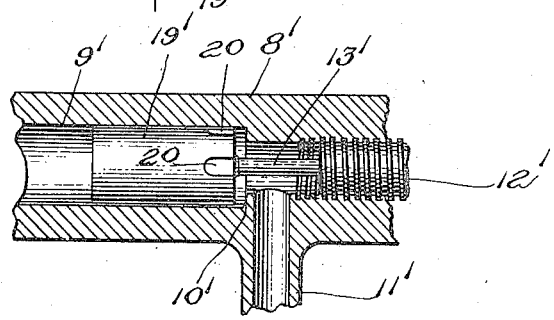
Witnesses:
L. P. Weymouth
R. K. Bremner
Inventor:
Joseph Lewis Stackpole
By Henry J. Miller
atty.

UNITED STATES PATENT OFFICE.

JOSEPH LEWIS STACKPOLE, OF BOSTON, MASSACHUSETTS, ASSIGNOR TO JOHN W. DAVIES, OF READING, MASSACHUSETTS.

EMULSIFIER.

1,152,127.

Specification of Letters Patent.

Patented Aug. 31, 1915.

Application filed May 8, 1911. Serial No. 625,839.

*To all whom it may concern:*

Be it known that I, JOSEPH LEWIS STACKPOLE, of Boston, in the county of Suffolk and State of Massachusetts, have invented certain new and useful Improvements in Emulsifiers, of which the following is a specification, reference being had to the accompanying drawings, forming part thereof This invention relates to improvements in machines for homogenizing or emulsifying milk or other liquid containing fatty matter.

The object of this invention is to provide a simple and efficient machine for so treating milk and other liquids carrying fatty matter in suspension that, without subjecting said milk or liquid to undue agitation, the fatty globules are to a large extent disrupted and the fatty matter thereof is distributed homogeneously through the liquid.

The invention consists in means whereby liquid under pressure is formed into an annular film or stream of invariable thickness in which the fatty globules are disrupted, partially by the vortical action of the liquid and partially by mechanical abrasion, and the fatty matter of said globules is distributed through the liquid.

The invention also consists in such other novel features of construction and combination of parts as shall hereinafter be more fully described and pointed out in the claims.

Figure 1, represents a side view of the improved emulsifier in combination with a pump and other accessories of well known construction. Fig. 2, represents an enlarged sectional view of the improved emulsifier. Fig. 3, represents a cross sectional view of the same taken on line 3—3 Fig. 2. Fig. 4, represents a view similar to Fig. 2 showing a modification of the emulsifier.

Similar numbers of reference designate corresponding parts throughout.

As shown in the drawing in its preferred form the improved emulsifier is shown in connection with the cylinder 5 of any well known pump or pressure machine adapted to exert pressure on liquid in said cylinder 5 to force said liquid through the emulsifier connected to said cylinder 5 by means of the connections 6 and 7. The emulsifier comprises the casing 8 having the bore 9 in which the milk or other liquid is received under pressure and having the cylindrical tapering chamber 10 which communicates near one end with the outlet 11 and is furnished with a screw thread in which the adjusting screw 12 engages. At its inner end this screw 12 has the contracted stem 13 while the outer end of said screw is furnished with the gear 14 which is engaged by the pinion 15 of the shaft 16, journaled in the frame 17, and having the hand wheel 18 by means of which the pinion 15 may be partially rotated to effect a partial rotation of gear 14 whereby the screw 12 may be nicely adjusted to effect the similar adjustment of the cylindrical tapering plug or emulsifying element 19, connected with said stem 13, relative to the wall of the cylindrical tapering chamber 10 which forms the other emulsifier element coöperating with said element 19 to form when adjusted a restricted annular and invariable channel or orifice through which the milk or other liquid is forced under pressure.

In Fig. 4 is illustrated a modified form of the invention in which the casing 8' is furnished interiorly with an emulsifying chamber 9' of cylindrical shape and having a parallel wall terminating preferably in the contracted seat or end 10' having the bore 9' which communicates with the outlet 11'. Within the chamber 9' is located the cylindrical emulsifier element 19' having a periphery parallel with its axis and of a diameter having a close sliding fit in the chamber 9', that is the diameter of the element 19' is approximately two one thousandths of an inch less than the inner diameter of the chamber 8'. At one end of this emulsifier element 19' has the grooves 20, 20 which form clearances, to facilitate the passage of the milk or other liquid from between the elements 8' and 19', and at this end said element 19' is sustained by the stem 13' of the screw 12' whereby an annular channel is formed between the periphery of the element 19' and the wall of the chamber or element 8'.

In both of the forms of emulsifiers shown herein the two coöperating emulsifying elements when combined form restricted annular channels which are invariable in width and are of considerable length so that when milk or other liquid carrying matter in globular form, in suspension, is forced under high pressure or at great speed through said channel the globules contacting, in their rush, with the comparatively rough surfaces of the emulsifying elements or with one another are disrupted by the abrasive action and the contents of said globules is distributed throughout the carrying liquid thus producing a homogeneous liquid or emulsion.

If, in the operation of the machine, the restricted channel formed between the emulsifier elements 10 and 19 becomes clogged the element 19 can be retracted by means of the screw 12 sufficiently to permit the liquid to pass between the elements to clear said channel.

Having thus described my invention I claim as new and desire to secure by Letters Patent—

1. An emulsifier comprising a chamber having a cylindrical screw threaded wall, a tapering extension of said wall and an outlet located at the end of said screw thread adjacent said tapering extension, a tapering plug located within said wall, and an adjusting screw for said plug engaged with said screw thread.

2. An emulsifier comprising a chamber having a cylindrical wall having a branch outlet and a tapering extension beyond said outlet, a tapering plug adjustable in said tapering extension, and means for resisting the outward movement of said plug.

JOSEPH LEWIS STACKPOLE.

Witnesses:
    HENRY J. MILLER,
    H. E. MORTON.